US010419781B2

(12) United States Patent
Hsieh et al.

(10) Patent No.: US 10,419,781 B2
(45) Date of Patent: Sep. 17, 2019

(54) STORING AND RETRIEVING HIGH BIT DEPTH IMAGE DATA

(71) Applicant: QUALCOMM Incorporated, San Diego, CA (US)

(72) Inventors: Cheng-Teh Hsieh, Del Mar, CA (US); In Suk Chong, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 15/270,914

(22) Filed: Sep. 20, 2016

(65) Prior Publication Data

US 2018/0084281 A1    Mar. 22, 2018

(51) Int. Cl.
*H04N 19/93* (2014.01)
*H04N 19/13* (2014.01)
*H04N 19/146* (2014.01)
*H04N 19/184* (2014.01)

(52) U.S. Cl.
CPC ............. *H04N 19/93* (2014.11); *H04N 19/13* (2014.11); *H04N 19/146* (2014.11); *H04N 19/184* (2014.11)

(58) Field of Classification Search
CPC ....... H04N 19/00121; H04N 19/00078; H04N 19/00884
USPC .......................................... 375/240.11–240.29
See application file for complete search history.

(56) References Cited

U.S. PATENT DOCUMENTS

| | | |
|---|---|---|
| 7,171,053 B2 | 1/2007 | Van Der Vleuten |
| 7,751,633 B1 | 7/2010 | Mukherjee |
| 7,936,932 B2 | 5/2011 | Bashyam et al. |
| 8,803,899 B2 | 8/2014 | Chen et al. |
| 9,071,398 B2 | 6/2015 | Lee et al. |
| 2007/0217704 A1 | 9/2007 | Zeng et al. |
| 2012/0219231 A1 | 8/2012 | Gharavi-Alkhansari et al. |
| 2014/0198841 A1* | 7/2014 | George ................. H04N 19/52 375/240.03 |

OTHER PUBLICATIONS

International Search Report and Written Opinion—PCT/US2017/043748—ISA/EPO—Oct. 11, 2017—17 pp.
Sharman K., et al., "AHG5: Range Extensions and High Bit Depths", 13. JCT-VC Meeting; 104. MPEG Meeting; Apr. 18, 2013—26-Incheon; (Joint Collaborative Team on Video Coding ISO/IEC JTC1/SC29/WG11 and ITU-T SG.16); URL: http://wftp3.1tu.int/av-arch/jctvc-site/, No. JCTVC-M0178, Apr. 8, 2013 (Apr. 8, 2013), XP030114135, pp. 1-21.
Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.
Response to Written Opinion filed in International Application No. PCT/US2017/043748 dated Jul. 16, 2018, 7 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Second Written Opinion issued in International Application No. PCT/US2017/043748 dated Aug. 8, 2018, 9 pp.
International Preliminary Report on Patentability—PCT/US2017/043748, The International Bureau of WIPO—Geneva, Switzerland, Nov. 12, 2018.

* cited by examiner

*Primary Examiner* — Anand S Rao
(74) *Attorney, Agent, or Firm* — Shumaker & Sieffert, P.A.

(57) ABSTRACT

In one example, a device for accessing image data includes a memory configured to store image data, the memory comprising a first region and a second region; and one or more processing units configured to code most significant bits (MSBs) of a plurality of residuals of samples of a block of an image, each of the residuals representing a respective difference value between a respective raw sample value and a respective predicted value for the respective raw sample value, access the coded MSBs in the first region of the memory, and access least significant bits (LSBs) of the plurality of residuals of the samples in the second region of the memory.

33 Claims, 11 Drawing Sheets

STORING AND RETRIEVING HIGH BIT DEPTH IMAGE DATA

TECHNICAL FIELD

This disclosure relates to storage and retrieval of image data.

BACKGROUND

Image data is used in a variety of applications, such as pictures and videos. Raw image data (that is, uncoded or decoded image data, such as pictures, video, graphics, or display data) is often stored prior to encoding, following decoding, following rendering, and/or in a display buffer for image data to be displayed. Storage and retrieval of raw image data tends to suffer bandwidth limitations in core processing systems, such as video, image, graphics, and display core systems.

Image processing systems such as video, image, and graphics processing pipelines, raw data are accessed (e.g., fetched or stored) as needed for processing by intermediate modules. For example, in the case of video processing, intermediate modules fetch raw data in the form of reference pixel data, original pixel data, reconstructed pixel data, and the like. Such data access requires high bandwidth (BW) usage, which leads to high power consumption. This is especially true for higher bit-depth (i.e., more than 8 bits/sample) data used in those pipelines (e.g., 10- or 12-bit high dynamic range (HDR) video processing). In such cases, the situation will be even worse with the burden of memory access (both internal and external memory) significantly increased due to data size misalignment. Usually, padding is needed for such higher bit-depth data to make the bits of the samples aligned with the normal word or byte memory accessing boundaries.

For example, 10-bit pixels may be stored in a 16-bit memory unit (such as in a P010 format), with 6 bits used only for padding purposes and not contributing to the actual sample value. Direct access of such data incurs a 37.5% bandwidth waste.

As another example, three 10-bit pixels could be stored into a 32-bit memory unit, with 2 bits unused for padding purpose. Direct access of such data incurs at least 6.25% bandwidth waste.

SUMMARY

In general, this disclosure describes techniques for accessing (e.g., storing and retrieving) image data, particularly high bit depth image data. The techniques of this disclosure generally include compressing most significant bits (MSBs) of samples in a block of an image while leaving least significant bits (LSBs) of the samples uncompressed. In addition, header data for each block may signal whether the MSBs are coded, and if so, the number of MSBs coded for each sample of the block. When the MSBs are coded (that is, compressed), the compression may be performed in a lossless manner. The MSBs and the LSBs may be stored together or separately, depending on the context in which these techniques are applied.

In one example, a method of accessing image data includes coding (e.g., encoding or decoding) most significant bits (MSBs) of a plurality of residuals of samples of a block of an image, each of the residuals representing a respective difference value between a respective raw sample value and a respective predicted value for the respective raw sample value, accessing (e.g., retrieving or storing) the coded MSBs in a first region of a memory, and accessing (e.g., retrieving or storing) least significant bits (LSBs) of the plurality of residuals of the samples in a second region of the memory.

In another example, a device for accessing image data includes a memory configured to store image data, the memory comprising a first region and a second region; and one or more processing units configured to code most significant bits (MSBs) of a plurality of residuals of samples of a block of an image, each of the residuals representing a respective difference value between a respective raw sample value and a respective predicted value for the respective raw sample value, access the coded MSBs in the first region of the memory, and access least significant bits (LSBs) of the plurality of residuals of the samples in the second region of the memory.

In another example, a device for accessing image data includes means for coding most significant bits (MSBs) of a plurality of residuals of samples of a block of an image, each of the residuals representing a respective difference value between a respective raw sample value and a respective predicted value for the respective raw sample value, means for accessing the coded MSBs in a first region of a memory, and means for accessing least significant bits (LSBs) of the plurality of residuals of the samples in a second region of the memory.

In another example, a computer-readable storage medium has stored thereon instructions that, when executed, cause a processor to code most significant bits (MSBs) of a plurality of residuals of samples of a block of an image, each of the residuals representing a respective difference value between a respective raw sample value and a respective predicted value for the respective raw sample value, access the coded MSBs in a first region of a memory, and access least significant bits (LSBs) of the plurality of residuals of the samples in a second region of the memory.

The details of one or more examples are set forth in the accompanying drawings and the description below. Other features, objects, and advantages will be apparent from the description and drawings, and from the claims.

DETAILED DESCRIPTION

Figure 1:
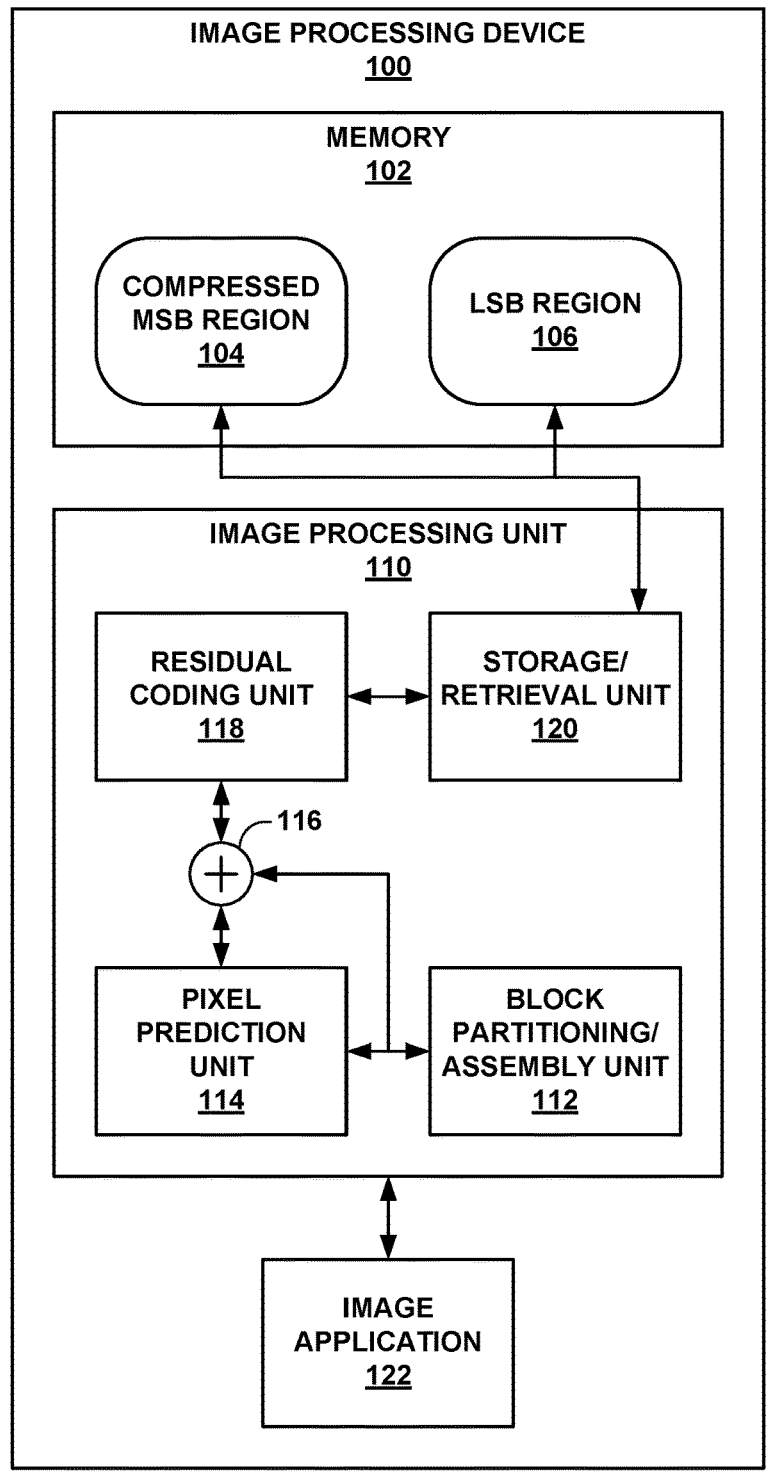
FIG. 1 is a block diagram illustrating an example system that implements techniques for accessing image data.

In general, this disclosure describes techniques for accessing (e.g., storing and/or retrieving) image data. Such techniques generally include accessing (e.g., storing and/or retrieving) image data in a memory in a bandwidth-efficient manner. In particular, when storing image data for example, a processing unit may partition the image into individual blocks of pixels. The processing unit may predict values for the pixels, e.g., using left- and/or above-neighboring pixels, and calculate residual values for the pixels representing differences between the predicted values and the actual values. The processing unit may then partition the residual values into most-significant bits (MSBs) and least-significant bits (LSBs). The processing unit may encode (e.g., in a lossless manner) the MSBs, and then store the encoded MSBs and the uncoded LSBs.

To retrieve the image data, the processing unit may perform a reciprocal process. That is, the processing unit may predict the pixels using reconstructed pixel values of left- and/or above-neighboring pixels. The processing unit may decode the MSBs values and concatenate the MSBs values with the respective LSBs values. The processing unit may then add the concatenated MSBs and LSBs values to the predicted values to reconstruct the pixel values for a block.

As explained in greater detail below, these techniques may be performed in a variety of contexts. For example, these techniques may be used to store raw image data in a still image camera, a video camera, a graphics processing pipeline, a display buffer, or in other contexts.

The processing unit may determine the number of MSBs dynamically. For example, the processing unit may determine the number of MSBs based on a total number of bits used for each residual value based on the size of a byte (i.e., eight bits), e.g., to ensure that the LSBs are byte-aligned. In some examples, the MSBs may correspond to the difference between the total number of bits for the residuals and eight bits (that is, one byte). For example, for 10-bit data, the MSBs may correspond to the two most significant bits of the residual values, and the LSBs may correspond to the remaining eight bits. In still other examples, there may be a variable number of MSBs from block to block.

The techniques of this disclosure may address one or more problems with conventional image storage techniques. For example, this disclosure recognizes that there exists a high bandwidth requirement for image data access. This high bandwidth requirement may not only limit overall system processing capabilities, but also significantly increase power consumption, and therefore degrade overall product quality, especially for mobile devices. Furthermore, data processing requirements, especially for mobile devices, continue to increase, in terms of video spatial and temporal resolutions and bit-depth resolution. Accordingly, the corresponding data bandwidth requirements continue to increase significantly. Accessing image data in memory has become one of the major bottlenecks in image and video processing unit implementations on mobile devices. Thus, the techniques of this disclosure may reduce the bandwidth requirements for accessing image and video data for image and video processing.

In other words, to reduce memory access bandwidth requirements for image or video data, this disclosure describes techniques that may be used to compress a number of most significant bit (MSB) from each pixel in a lossless manner. More specifically, given a block of video data, a number of MSB from each pixel may be separated from its LSB portion to form a block of MSB video data and a block of LSB video data respectively. Lossless compression may then be applied to the MSB block to effectively reduce the data size before it is used for memory access.

During memory access, the block of video data may be fetched in a manner such that the compressed MSB portion and the non-compressed LSB portion are fetched together. With proper decoding, the MSB portion may be reconstructed to original values and used together with the LSB portion. With the MSB portion significantly compressed, such a scheme can effectively reduce actual memory access bandwidth requirements.

Additionally, based on the techniques of this disclosure, the number of MSBs from each pixel used to form the MSB block does not have to be a fixed number. Instead, the number may be adaptively determined and signaled in the compressed MSB bitstream. As a result, such techniques may be referred to as Adaptive Most Significant Bits Compression (AMSBC).

One general idea of AMSBC is based on the correlation characteristics of images and/or video data, that is, the amplitude correlation among spatially neighbored video/image samples. Especially, MSB bits among neighboring samples may be significantly more correlated than LSB bits. As a result, a high compression ratio can be achieved, even with lossless coding.

Simulation results indicate that the techniques of this disclosure provide good compression ratios for at least 10-bit and 8-bit video sequences. These techniques may be applied to other types of image and video data as well (e.g., images and video data having other numbers of bits per pixel, e.g., 12 or more bits per pixel).

FIG. 1 is a block diagram illustrating an example image processing device 100 that may perform the techniques of this disclosure. In this example, image processing device 100 includes memory 102, image processing unit 110, and image application 122. Image application 122 represents one or more image applications that may store and/or retrieve data to/from memory 102. For example, image application 122 may represent an application that receives one or more still images from a camera (not shown) of image processing device 100. As another example, image application 122 may represent a computer graphics program, such as a video game, ray tracing program, computer graphics generation program for digital movie production, or the like. As still another example, image application 122 may represent a controller for a display buffer (not shown) that stores images until the images are ready to be displayed on a display (not shown) coupled to or incorporated into image processing device 100.

Memory 102 may represent any of a variety of computer-readable storage media for storing data. For example, memory 102 may represent a random access memory (RAM), such as dynamic random access memory (DRAM), extended data-out RAM (EDO RAM), synchronous DRAM (SDRAM), double data rate SDRAM (DDR SDRAM), or the like. Alternatively, memory 102 may represent read-only memory (ROM), such as programmable ROM (PROM), erasable programmable ROM (EPROM), electronically erasable programmable read only memory (EEPROM), or the like. As still another example, memory 102 may represent a hard disk, flash drive, solid state drive, tape drive, or the like. Furthermore, memory 102 may include any combination of these or other computer-readable storage media.

Image processing unit 110 provides access to image data stored on memory 102 by image application 122 in the example of FIG. 1. In this example, image processing unit 110 includes block partitioning/assembly unit 112, pixel prediction unit 114, addition/subtraction unit 116, residual coding unit 118, and storage/retrieval unit 120.

When storing an image to memory 102, image processing unit 110 may initially receive the image from image application 122. Image processing unit 110 passes the image to block partitioning/assembly unit 112, which partitions the image into individual blocks of pixels. The blocks may have fixed or variable sizes, which may be square, rectangular, or non-rectangular shapes. For example, the blocks may have square or rectangular shapes defined by the number of pixels included in the blocks, such as 4×4, 4×8, 8×4, 8×8, 16×4, 16×8, 16×16, 4×16, 8×16, 32×4, 32×8, 32×16, 32×32, 4×32, 8×32, 16×32, and so on. The blocks of an image may have a common size or different sizes. Block-based partitioning may take advantage of correlation of neighboring pixels in an image for better compression efficiency, and also offer the ease of random access and processing. Block shape and size may be dependent on user implementation preferences and/or requirements of image application 122.

After block partitioning/assembly unit 112 partitions an image into blocks, the remaining components of image processing unit 110 may process the blocks according to the techniques of this disclosure. For example, pixel prediction unit 114 may predict values for pixels of a block based on previously coded pixels of the block. Assuming the pixels are processed in a raster scan order, pixel prediction unit 114 may use a value of "0" as a predictor for the upper-left pixel of the block. Then, for subsequent pixels of the block in the top row, pixel prediction unit 114 may predict the pixels using left-neighboring pixels. After predicting the top row of pixels, pixel prediction unit 114 may predict the remaining pixels of the block using left-, above-left, and/or above-neighboring pixels. Pixel prediction unit 114 may signal values for syntax elements indicating whether pixels are predicted from left- and/or above-neighboring pixels, in some examples. Using such a prediction strategy, all predictors are within the current block, and therefore there is no dependency between blocks, which allows the techniques of this disclosure to be random access friendly.

Addition/subtraction unit 116 calculates residual values for the pixels of the block. In particular, addition/subtraction unit 116 calculates the difference between an actual value for a pixel and the predicted value for the pixel as the residual value for the pixel. In this manner, addition/subtraction unit 116 produces a block of residual values. The prediction and residual calculation processes performed by pixel prediction unit 114 and addition/subtraction unit 116 may effectively increase the correlation of most significant bits (MSBs) of neighboring residual values, thereby improving compression efficiency for compression performed by residual coding unit 118. In this manner, MSBs and least significant bits (LSBs) discussed herein refer to MSBs and LSBs of residual values, rather than the pixel values directly.

Residual coding unit 118 may then encode the residual values according to the techniques of this disclosure. In one example, residual coding unit 118 may perform run length coding using variable length coding (VLC) to compress the MSBs of the residual values of a block. In run-length coding using VLC, residual coding unit 118 determines the value of the MSBs of a current residual value, as well as the number of residual values having MSBs of the same value in coding order (e.g., raster scan order). Residual coding unit 118 then selects a VLC codeword representing both the MSBs value and the run value. Residual coding unit 118 may continue selecting such codewords until the block has been fully coded. Run length coding using VLC represents an example of lossless coding. That is, by using the VLC codewords, the MSBs of the residual values of the block can be reconstructed without loss.

Residual coding unit 118 may use fixed VLC codeword tables or dynamic/adaptive VLC codeword tables. Examples of techniques for generating fixed VLC codeword tables include Truncated-Unary (TU) codeword table generation and Exponential-Golomb (EG) codeword table generation. Alternatively, residual coding unit 118 may generate or update a VLC codeword table on the fly, for example, based on the number of MSBs to be compressed.

After coding the MSBs in this fashion, residual coding unit 118 may determine whether the number of bits used to represent the coded MSBs combined with the number of bits in the LSBs is smaller than the total number of bits used to represent the original pixel values for the block, representing whether the MSBs are in fact compressed. If the coded MSBs are compressed (i.e., the number of bits used to represent the coded MSBs and the LSBs is less than the number of bits used to represent the original pixel values for the block), residual coding unit 118 may signal a value for a syntax element (such as a compression flag, e.g., a one-bit flag) indicating that the MSBs are coded. Alternatively, if the coded MSBs are not sufficiently compressed (e.g., are represented using a number of bits that is greater than a threshold value less than the uncoded MSBs), residual coding unit 118 may signal a value for the syntax element (such as the compression flag) indicating that the MSBs are not coded, in which case residual coding unit 118 may code the block using pulse code modulation (PCM) mode.

In addition, residual coding unit 118 may determine the number of MSBs to be coded per residual value. For example, residual coding unit 118 may select the number of MSBs based on the lengths of the residual values for the block. In some examples, residual coding unit 118 may select the number of MSBs as a largest number of bits of the residual values that exceeds a byte boundary, such that the LSBs are byte-aligned.

Ultimately, residual coding unit 118 may produce a data structure including a syntax element indicating whether the MSBs are coded, the number of MSBs that are coded, coded data for the MSBs, and potentially uncoded data for the LSBs. Alternatively, the data structure may include pointers to memory addresses of the LSBs. In still other examples, the data structure may include a pointer to a memory address including a set of one or more pointers to the memory addresses of the LSBs. Residual coding unit 118 provides this data structure, along with the LSBs, to storage/retrieval unit 120. Storage/retrieval unit 120 stores the data structure to compressed MSB region 104 of memory 102, and the LSBs to LSB region 106. In this manner, storage/retrieval unit 120 may store MSBs data and LSBs data to distinct regions of memory 102.

In other examples, storage/retrieval unit 120 stores MSBs data (which is compressed) and LSBs data to the same region of memory 102. That is, compressed MSB region 104 and LSB region 106 may comprise the same region. Generally, MSBs data and LSBs data could be stored separately if it is expected that individual blocks of the image will be retrieved individually, without necessarily retrieving the entire image, e.g., as may be the case for image or video coding. Such a storage scheme may be used in examples where the entire image is accessed at the same time as well, or MSBs data and LSBs data may be stored in the same region of memory 102 when the entire image is accessed at the same time. The entire image may be accessed, for example, during graphics processing or when image processing unit 110 forms part of or interacts with a display buffer.

After an image has been stored in this manner, image application 122 may request to retrieve the image. In essence, image processing unit 110 performs a reciprocal process to the process discussed above to retrieve the image. That is, storage/retrieval unit 120 retrieves the MSBs data and the LSBs data from compressed MSB region 104 and LSB region 106, respectively. In one example, storage/retrieval unit 120 may retrieve the MSBs data from compressed MSB region 104 and determine addresses of the LSBs data using pointers stored with the MSBs data, which may correspond to addresses of the LSBs data. Alternatively, the pointers to the LSBs may be stored elsewhere, e.g., with header data for the block to which the MSBs and the LSBs correspond. Storage/retrieval unit 120 then passes the MSBs data and LSBs data to residual coding unit 118.

Residual coding unit 118 reconstructs the residual values for each block by determining, for example, the VLC codewords and the corresponding MSBs values and run lengths from a VLC table. Residual coding unit 118 then concatenates each MSBs value with a corresponding LSBs value to reconstruct the residual values. Residual coding unit 118 passes a first residual value of the block, along with a predicted value of "0," to addition/subtraction unit 116, which passes the reconstructed value to pixel prediction unit 114. Afterwards, residual coding unit 118 passes each residual value for each subsequent pixel to addition/subtraction unit 116, and pixel prediction unit 114 passes a predicted value for each pixel to addition/subtraction unit 116, which reconstructs the corresponding pixel and passes the reconstructed pixels to pixel prediction unit 114.

Ultimately, pixel prediction unit 114 receives the pixel values for each block in this manner. Pixel prediction unit 114 passes the blocks to block partitioning/assembly unit 112 to reconstruct the image (e.g., a bitstream) from the blocks. Block partitioning/assembly unit 112 may then return the reconstructed image to image application 122.

Figure 2A:
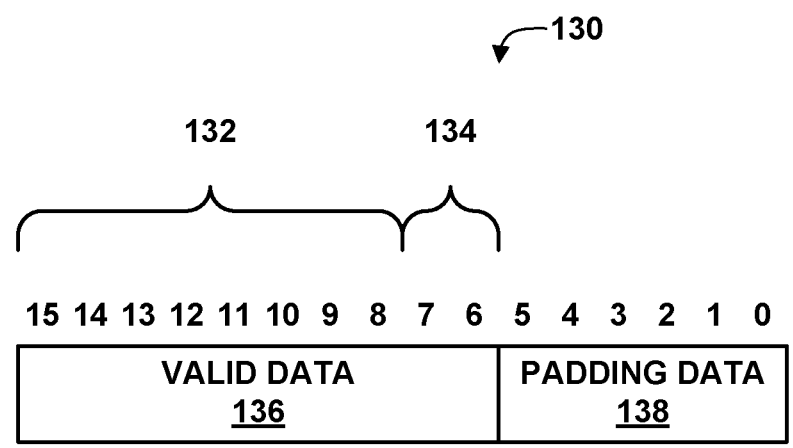
FIGS. 2A and 2B are conceptual diagrams illustrating example pixel storage formats.
Figure 2B:
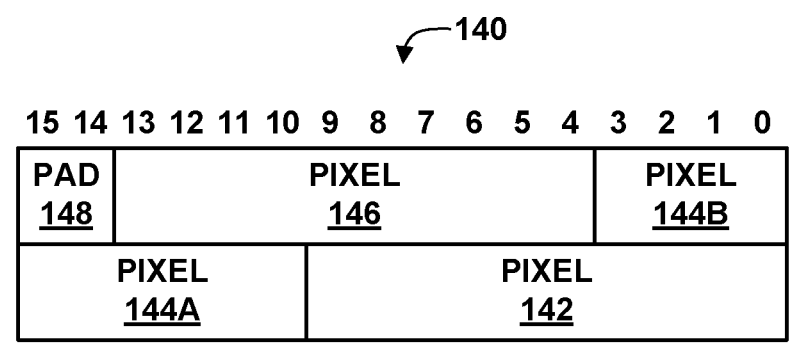

FIGS. 2A and 2B are conceptual diagrams illustrating various pixel data storage formats. FIG. 2A is a conceptual diagram illustrating a P010 format for storing 10-bit pixel 130. In this example, pixel 130 includes an integer component 132 and a fractional component 134. Each pixel according to the P010 format occupies two bytes (16 bits, numbered 0 to 15 in FIG. 2A) of memory. However, because each pixel is only 10-bits of data (represented as valid data 136 in the example of FIG. 2A), there are six bits of padding data 138. In effect, padding data 138 is "wasted" and contributes to bandwidth waste for the pixel. Memory addresses are typically byte-aligned, meaning that one or more full bytes are read or written at a time. Because six bits of the sixteen bits are just padding data 138, the P010 format results in a 37.5% bandwidth waste.

FIG. 2B is a conceptual diagram illustrating an example in which a group 140 of three 10-bit pixels are stored in four bytes of memory (e.g., 32 bits of memory or a pair of 16-bit memory entries). In this example, group 140 includes pixel 142, pixel 144 (resulting from the concatenation of pixel data 144A and pixel data 144B), and pixel 146, as well as padding data 148. In the example of FIG. 2B, only two bits are used as padding, resulting in 6.25% bandwidth waste. However, in order to access pixel 144, the entire 32-bit group 140 must be read. Thus, data for pixel 142 and pixel 146 may be considered wasted if only pixel 144 is of interest.

Figure 3:
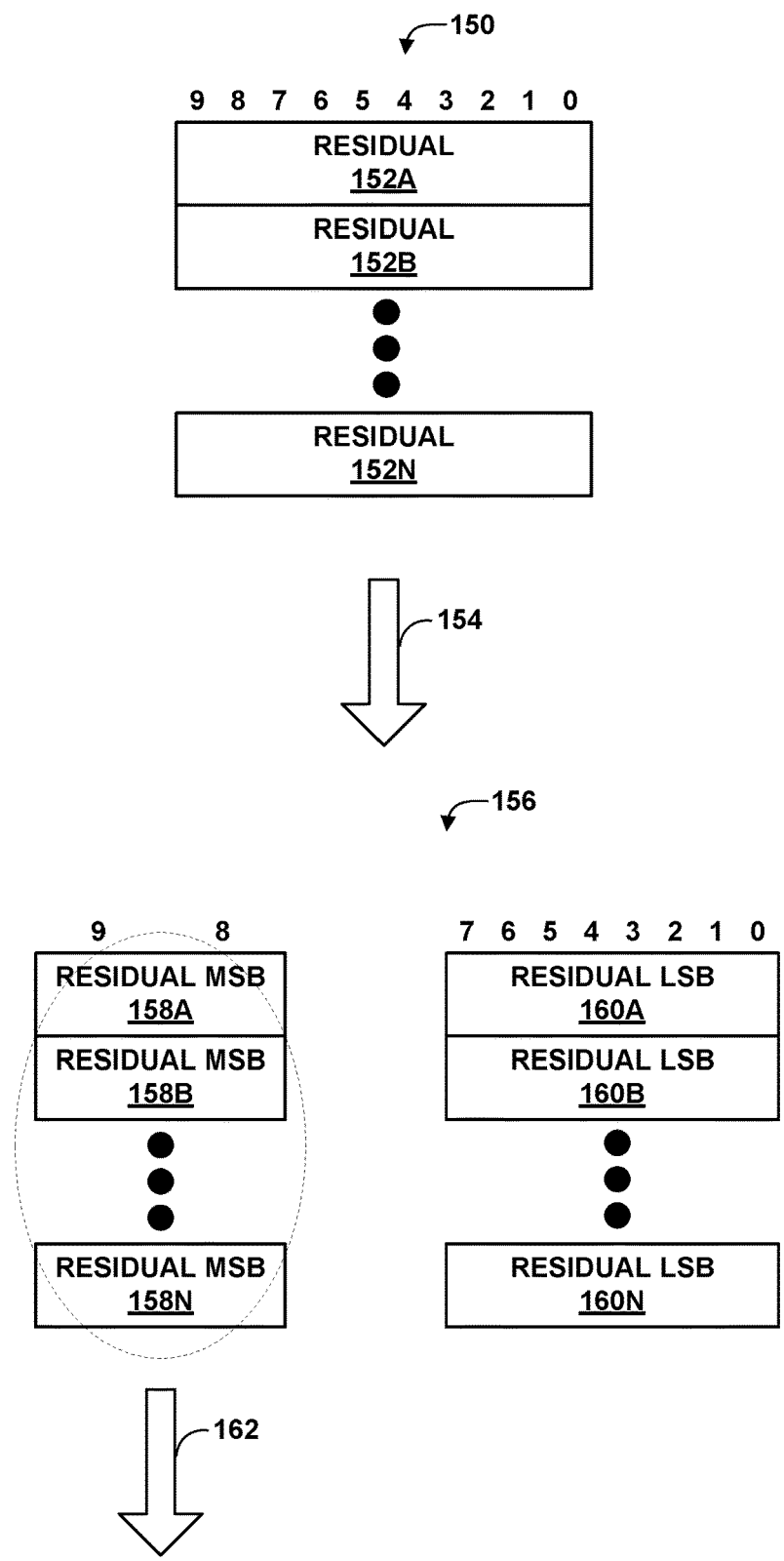
FIG. 3 is a conceptual diagram illustrating certain aspects of the techniques of this disclosure.

FIG. 3 is a conceptual diagram illustrating certain aspects of the techniques of this disclosure. The techniques of FIG. 3 are explained with respect to the components of image processing device 100 (FIG. 1). Initially, when storing an image, as discussed above, block partitioning/assembly unit 112 partitions an image into blocks, and pixel prediction unit 114 predicts the pixels of a particular block. Addition/subtraction unit 116 then calculates residual values for the pixels of the block. Residual block 150 of FIG. 3 represents a set of residual values 152A-152N (residual values 152). In this example, the residual values each have ten bits, although it should be understood that in other examples, the residual values may generally have any number of bits.

In accordance with the techniques of this disclosure, residual coding unit 118 (FIG. 1) partitions (154) residual values 152 into respective sets of residual MSBs 158A-158N (residual MSBs 1568) and residual LSBs 160A-160N (residual LSBs 160), forming a set of MSBs and LSBs 156. That is, residual MSB 158A concatenated with residual LSB 160A yields residual value 152A, residual MSB 158B concatenated with residual LSB 160B yields residual value 152B, and so on. Residual coding unit 118 then losslessly encodes (162) residual MSBs values 158. The encoded residual MSBs and residual LSBs 160 may then be stored, e.g., in the same or separate memory regions.

FIG. 3 is explained and illustrated with respect to the image storing and encoding techniques of this disclosure. Of course, it should be understood that a reciprocal process may be performed to retrieve and decode an image. In particular, residual coding unit 118 may retrieve encoded residual MSBs and uncoded residual LSBs. Residual coding unit 118 may then decode the encoded residual MSBs to reproduce residual MSBs 158. Residual coding unit 118 may then concatenate residual MSBs 158 with corresponding residual LSBs 160 to reproduce residual values 152. That is, residual coding unit 118 may concatenate residual MSB 158A with residual LSB 160A to reproduce residual value 152A, concatenate residual MSB 158B with residual LSB 160B to reproduce residual value 152B, and so on, to reproduce each of residual values 152. Residual coding unit 118 may then pass the reconstructed residual values 152 to addition/subtraction unit 116, which in concert with pixel prediction unit 114 may reproduce the block.

Figure 4:
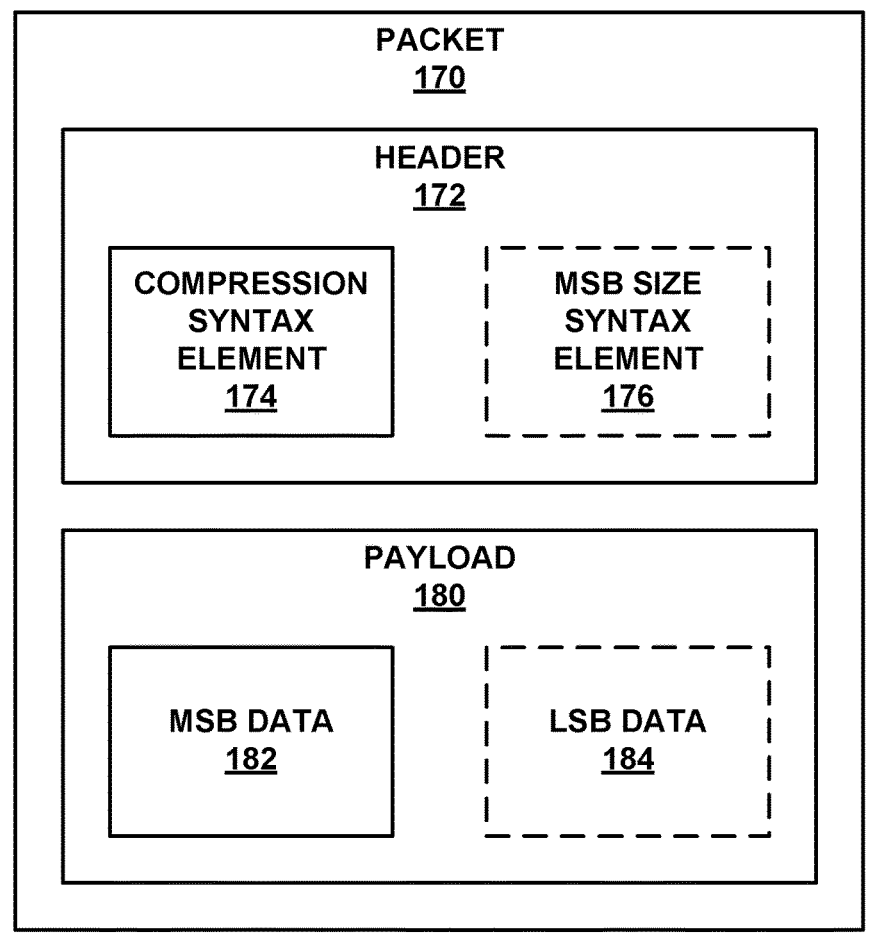
FIG. 4 is a block diagram illustrating an example packet including data for a block of an image in accordance with the techniques of this disclosure.

FIG. 4 is a block diagram illustrating an example packet 170 including data for a block of an image in accordance with the techniques of this disclosure. In this example, packet 170 includes header 172 and payload 180. Header 172 represents metadata and in this example includes compression syntax element 174 and MSB size syntax element 176. MSB size syntax element 176 is illustrated using a broken line to indicate that MSB size syntax element 176 is optionally present. In particular, the value of compression syntax element 174 may represent whether or not MSBs of residual values for a block corresponding to packet 170 are coded (that is, compressed).

If the value of compression syntax element 174 indicates that the MSBs are coded/compressed, MSB size syntax element 176 may be present and have a value indicating the number of MSBs included for each residual value. In the example of FIG. 3, the value of compression syntax element 174 may indicate that the MSBs are coded, and the value of MSB size syntax element 176 may indicate that the size of the MSBs is two (because each of residual MSBs 158 has two bits in the example of FIG. 3).

In practice, to achieve a high coding efficiency, the number of MSBs to be compressed may be dependent on data contents. For example, for smoother content where the correlation between neighboring pixels is higher, the optimal number of MSBs per pixel to compress may be larger. Therefore, according to the techniques of this disclosure, residual coding unit 118 may determine how many MSBs per residual are to be compressed adaptively during the encoding stage and signaled using MSB size syntax element 176. Such signaling may be done for each block. That is, each block of video data may correspond to a unique instance of packet 170. In other examples, the MSB size value may be signaled at a higher level, e.g., at a level of a group of blocks, or a slice, a frame, or multiple frames. In one example, MSB size syntax element 176 may take an integer value between 0 and a full bit-depth value for the pixels of the block.

In this example, payload 180 includes MSB data 182 and LSB data 184. It is assumed for purposes of example and illustration that payload 180 includes compressed data for MSB data 182. That is, MSB data 182 may include VLC codewords representing non-zero residual pixel values and run values indicating a number of zero-valued pixels in coding order until the next non-zero residual pixel. LSB data 184 is shown in broken lines to indicate that LSB data 184 is optional. When included, LSB data 184 may include the uncompressed LSBs themselves, or data representing a location of the corresponding LSBs, such as pointers including memory addresses of the LSBs.

Alternatively, when the value of compression syntax element 174 indicates that the MSBs are not compressed, payload 180 may include either uncompressed data for the block or one or more pointers that include memory addresses for the uncompressed data for the block. In the uncompressed case, payload 180 would not include separate MSBs data 182 and LSBs data 184.

Figure 5:
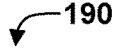
FIG. 5 is a conceptual diagram illustrating block of residual values.

FIG. 5 is a conceptual diagram illustrating block 190 of residual values 192A-192R (residual values 192). In one example, residual coding unit 118 may code residual values 192 in a raster scan order. That is, residual coding unit 118 may code the residual values in the following order: residual value 192A, residual value 192B, residual value 192C, residual value 192D, residual value 192E, residual value 192F, residual value 192G, residual value 192H, residual value 192J, residual value 192K, residual value 192L, residual value 192M, residual value 192N, residual value 192P, residual value 192Q, and residual value 192R. Alternatively, residual coding unit 118 may code residual values 192 in a different order, such as snake order. For snake order, residual coding unit 118 may code the residual values in the following order: residual value 192A, residual value 192B, residual value 192C, residual value 192D, residual value 192H, residual value 192G, residual value 192F, residual value 192E, residual value 192J, residual value 192K, residual value 192L, residual value 192M, residual value 192R, residual value 192Q, residual value 192P, and residual value 192N. In still other examples, other scan orderings may be used, such as reverse raster scan, top-to-bottom, bottom-to-top, zig-zag scan, or reverse zig-zag scan orders.

The residual value at the starting scan position may correspond to the actual pixel value. Assuming, for example, that the scan starts at residual value 192A, residual value 192A may be equal to the corresponding actual pixel value. That is, a predictor value of "0" may be used to calculate residual value 192A. Alternatively, a default predictor value may be used to predict the pixel at the position of residual value 192A.

Assuming that the scan order is raster scan order starting at residual value 192A, pixel prediction unit 114 may predict the pixel at the position of residual value 192B using residual value 192A. Likewise, pixel prediction unit 114 may predict the pixel at the position of residual value 192B using the pixel value at the position of residual value 192A, predict the pixel at the position of residual value 192C using the pixel value at the position of residual value 192B, and predict the pixel at the position of residual value 192D using the pixel value at the position of residual value 192C.

After predicting pixels in the top row (i.e., pixels at positions of residual values 192A-192D), pixel prediction unit 114 may predict values of subsequent pixels using values of above-, above-left-, and/or left-neighboring pixels. For example, pixel prediction unit 114 may predict the value of the pixel at the position of residual value 192K using the values of the pixels at positions of residual values 192E, 192J, and/or 192F.

Figure 6:
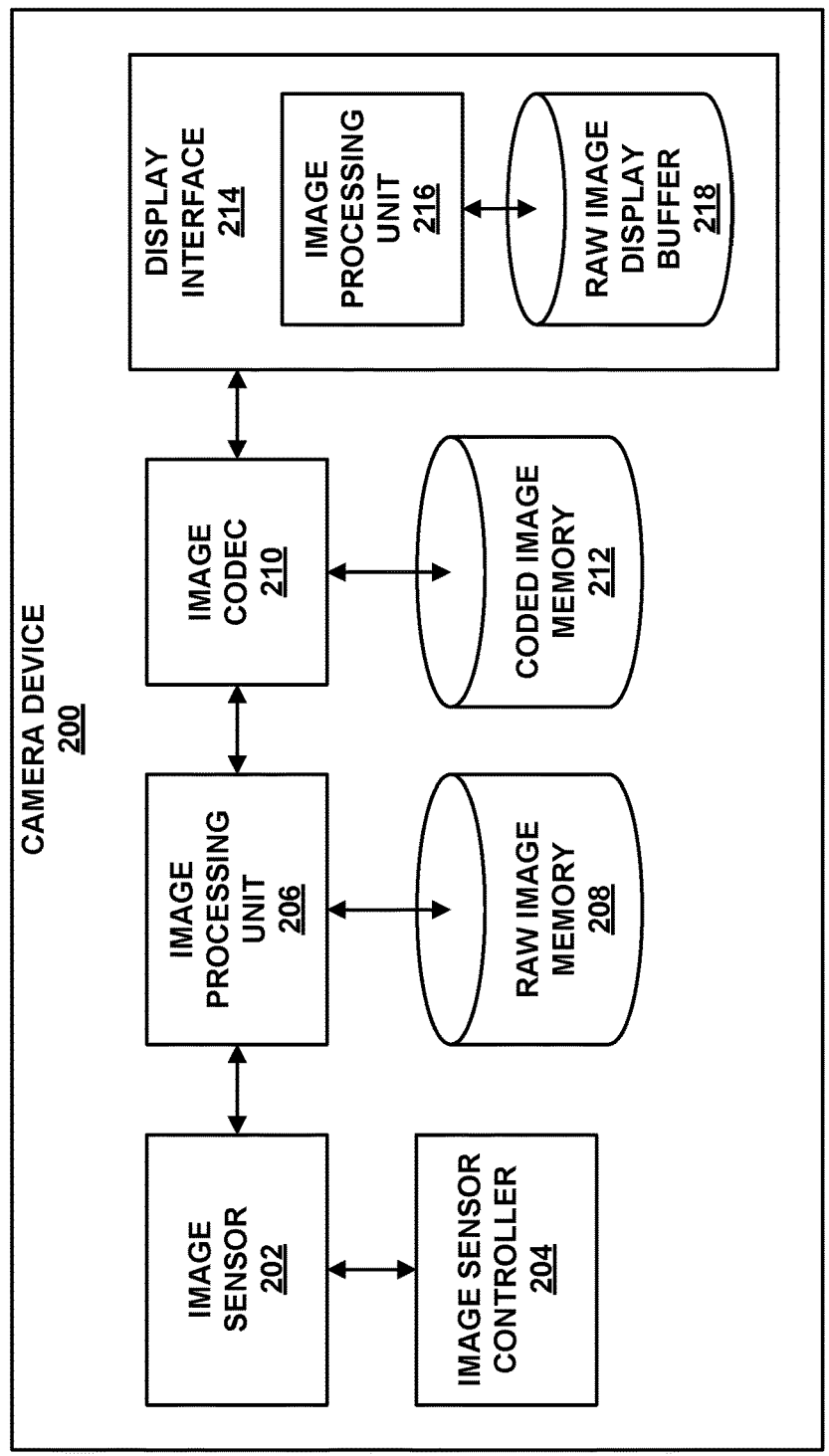
FIG. 6 is a block diagram illustrating an example camera device that may use the techniques of this disclosure.

FIG. 6 is a block diagram illustrating an example camera device 200 that may use the techniques of this disclosure. In this example, camera device 200 includes image sensor 202, image sensor controller 204, image processing unit 206, raw image memory 208, image codec (encoder/decoder) 210, coded image memory 212, and display interface 214. Display interface 214 includes image processing unit 216 and raw image display buffer 218.

In general, raw image memory 208 and raw image display buffer 218 may be configured similarly to memory 102 of FIG. 1. Similarly, as discussed below, image processing unit 206 and image processing unit 216 may each be configured similarly to image processing unit 110 of FIG. 1.

Image sensor 202 includes a sensor array for capturing image data in the visible light spectrum. For example, image sensor 202 may include one or more two-dimensional arrays of sensors for capturing red, green, and blue spectra light. Image sensor controller 204 controls image sensor 202. Image sensor controller 204 may include a user interface, such as a physical or virtual (e.g., touchscreen-displayed) button. Image sensor controller 204 may determine when a user has pressed the button and, in response to the user pressing the button, cause image sensor 202 to capture an image and pass raw image data for the image to image processing unit 206.

Image processing unit 206 may be configured according to the techniques of this disclosure to store the captured image to raw image memory 208. That is, image processing unit 206 may convert the image to a set of blocks (such as block 190 of FIG. 5) including a number of pixels (arranged according to, e.g., residual values 192 of FIG. 5). Picture processing unit 206 may predict values for the pixels, e.g., using left- and/or above-neighboring pixels, and calculate residual values for the pixels as differences between the current values and the predicted values. Picture processing unit 206 may then encode MSBs of the residual values using, e.g., a lossless coding process such as run-length VLC. Picture processing unit 206 may then store the encoded MSBs and the remaining LSBs to raw image memory 208. As shown in FIG. 1, the MSBs and LSBs may be stored in separate memory regions of raw image memory 208. Such a storage scheme may be advantageous for raw image memory 208 of camera device 200, which stores the image until image codec 210 is ready to encode the image. Such encoding may be performed on a block-by-block basis.

Image codec 210 may ultimately retrieve the raw image from raw image memory 208 via image processing unit 206. Thus, in accordance with the techniques of this disclosure, image processing unit 206 may retrieve the image from raw image memory 208. In particular, image processing unit 206 may retrieve encoded MSBs for a block of the image, decode the MSBs, and concatenate the MSBs with LSBs retrieved from raw image memory 208 to reproduce residual values. Image processing unit 206 may then combine the residual values with corresponding predicted values to reproduce the pixel values of the block. Image processing unit 206 may then assemble the blocks to form all or part of the image, and pass the blocks to image codec 210.

Image codec 210 may be configured to encode and decode image data according to an image coding standard, such as Joint Photographic Experts Group (JPEG). In other examples, image codec 210 may represent a video codec configured to encode and decode video data according to a video coding standard, such as ITU-T H.264/AVC (Advanced Video Coding), ITU-T H.265 (High Efficiency Video Coding), or the like. An example of a video encoder is shown in and discussed with respect to FIG. 7 below. Moreover, a separate image processing unit from image processing unit 206 may be provided within the video codec, as explained with respect to FIG. 7.

Image codec 210 may store the encoded image to coded image memory 212. Raw image memory 208 and coded image memory 212 may represent separate portions (e.g., regions) of a common memory, or physically distinct computer-readable storage media.

Display interface 214 may subsequently request access to a coded image to cause the image to be displayed, e.g., on a display of camera device 200 (not shown). Accordingly, display interface 214 may retrieve the image from coded image memory 212 via image codec 210. Image codec 210 may decode the image in preparation for display. In accordance with the techniques of this disclosure, display interface 214 may include an image processing unit 216 and a raw image display buffer 218. Image processing unit 216 may store the raw (i.e., decoded) image to raw image display buffer 218 in accordance with the techniques of this disclosure, until the image is ready to be displayed on the display. When the image is to be displayed, image processing unit 216 may retrieve the image from raw image display buffer 218 according to the techniques of this disclosure, and pass the raw image to the display.

In this manner, camera device 200 represents an example of a device for storing image data, the device comprising a memory configured to store image data, the memory comprising a first region and a second region; and one or more processing units configured to code most significant bits (MSBs) of a plurality of residuals of samples of a block of an image, each of the residuals representing a respective difference value between a respective raw sample value and a respective predicted value for the respective raw sample value, access the coded MSBs in the first region of the memory, and access least significant bits (LSBs) of the plurality of residuals of the samples in the second region of the memory.

Figure 7:
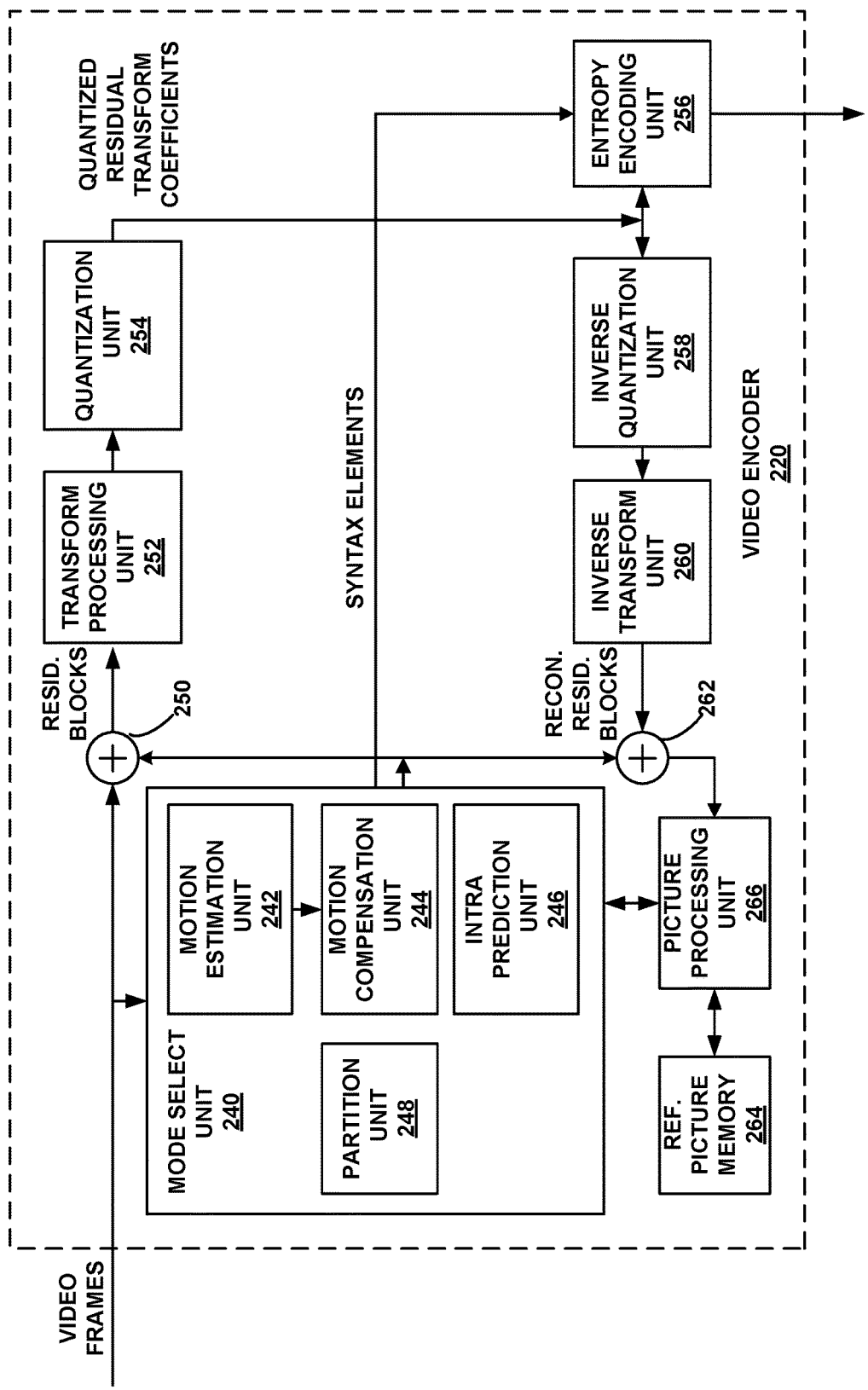
FIG. 7 is a block diagram illustrating an example video encoder including a picture processing unit that implements techniques for accessing high bit depth image data in accordance with the techniques of this disclosure.

FIG. 7 is a block diagram illustrating an example video encoder 220 including a picture processing unit 266 that implements techniques for storing high bit depth image data in accordance with the techniques of this disclosure. As explained in greater detail below, coding of video data may include inter-prediction and/or inter-prediction of the video data. Video encoder 220 may perform intra- and inter-prediction of video blocks within video slices. Intra-mode (I mode) may refer to any of several spatial based coding modes. Inter-modes, such as uni-directional prediction (P mode) or bi-prediction (B mode), may refer to any of several temporal-based coding modes.

Intra-prediction relies on spatial prediction to reduce or remove spatial redundancy in video within a given video frame or picture. Inter-prediction relies on temporal prediction to reduce or remove temporal redundancy in video within adjacent frames or pictures of a video sequence. Picture processing unit 266 stores previously encoded and then decoded image data in reference picture memory 264, in this example. Likewise, picture processing unit 266 retrieves such previously encoded and decoded image data from reference picture memory 264, in this example. Picture processing unit 266 may correspond to image processing unit 110 of FIG. 1. Thus, picture processing unit 266 may implement the techniques of this disclosure related to encoding and storing (or retrieving and decoding) MSBs of residual pixels of raw image data and storing or retrieving corresponding LSBs of the residual pixels of the raw image data to or from reference picture memory 264.

As shown in FIG. 7, video encoder 220 receives a current video block within a video frame to be encoded. In the example of FIG. 7, video encoder 220 includes mode select unit 240, reference picture memory 264 (which may also be referred to as a decoded picture buffer (DPB)), picture processing unit 266, summer 250, transform processing unit 252, quantization unit 254, and entropy encoding unit 256. Mode select unit 240, in turn, includes motion estimation unit 242, motion compensation unit 244, intra-prediction unit 246, and partition unit 248. For video block reconstruction, video encoder 220 also includes inverse quantization unit 258, inverse transform unit 260, and summer 262. A deblocking filter (not shown in FIG. 7) may also be included to filter block boundaries to remove blockiness artifacts from reconstructed video. If desired, the deblocking filter (or other filters) would typically filter the output of summer 262.

During the encoding process, video encoder 220 receives a video frame or slice to be coded. The frame or slice may be divided into multiple video blocks, e.g., by partition unit 248. Motion estimation unit 242 and motion compensation unit 244 perform inter-predictive encoding of received video blocks relative to one or more blocks in one or more reference frames to provide temporal prediction. Intra-prediction unit 246 may alternatively perform intra-predictive encoding of received video blocks relative to pixels of one or more neighboring blocks in the same frame or slice as the block to be coded, to provide spatial prediction. Video encoder 220 may perform multiple coding passes, e.g., to select an appropriate coding mode for each block of video data. Mode select unit 240 may retrieve reference data (e.g., neighboring pixel data in the case of intra-prediction or pixel data of previously encoded and decoded images in the case of inter-prediction) from reference picture memory 264 via picture processing unit 266.

Moreover, partition unit 248 may partition blocks of video data into sub-blocks, based on evaluation of previous partitioning schemes in previous coding passes. For example, partition unit 248 may initially partition a frame or slice into coding tree units (CTUs), and partition each of the CTUs into sub-coding units (CUs) based on rate-distortion analysis (e.g., rate-distortion optimization). Mode select unit 240 may further produce a quadtree data structure indicative of partitioning of a CTU into sub-CUs. Leaf-node CUs of the quadtree may include one or more prediction units (PUs) and one or more transform units (TUs).

Mode select unit 240 may select one of the prediction modes, intra or inter, e.g., based on error results, and provides the resulting predicted block to summer 250 to generate residual data and to summer 262 to reconstruct the encoded block for use as a reference frame. Mode select unit 240 also provides syntax elements, such as motion vectors, intra-mode indicators, partition information, and other such syntax information, to entropy encoding unit 256.

Motion estimation unit 242 calculates a motion vector for a PU of a video block in an inter-coded slice by comparing the position of the PU to the position of a predictive block of a reference picture stored in reference picture memory 264. The reference picture may be selected from a first reference picture list (List 0) or a second reference picture list (List 1), each of which identify one or more reference pictures stored in reference picture memory 264. Motion estimation unit 242 sends the calculated motion vector to entropy encoding unit 256 and motion compensation unit 244.

Motion compensation, performed by motion compensation unit 244, may involve fetching or generating the predictive block from reference picture memory 264 based on the motion vector determined by motion estimation unit 242. Motion estimation unit 242 and motion compensation unit 244 may be functionally integrated, in some examples. Upon receiving the motion vector for the PU of the current video block, motion compensation unit 244 may locate the predictive block to which the motion vector points in one of the reference picture lists, and prompt mode select unit 240 to retrieve the predictive block (or data used to generate the predictive block) from reference picture memory 264 via picture processing unit 266. Summer 250 forms a residual video block by subtracting pixel values of the predictive block from the pixel values of the current video block being coded, forming pixel difference values, as discussed below. In general, motion estimation unit 242 performs motion estimation relative to luma components, and motion compensation unit 244 uses motion vectors calculated based on the luma components for both chroma components and luma components. Mode select unit 240 may also generate syntax elements associated with the video blocks and the video slice for use by a video decoder in decoding the video blocks of the video slice.

Intra-prediction unit 246 may intra-predict a current block, as an alternative to the inter-prediction performed by motion estimation unit 242 and motion compensation unit 244, as described above. In particular, intra-prediction unit 246 may determine an intra-prediction mode to use to encode a current block. In some examples, intra-prediction unit 246 may encode a current block using various intra-prediction modes, e.g., during separate encoding passes, and intra-prediction unit 246 (or mode select unit 240, in some examples) may select an appropriate intra-prediction mode to use from the tested modes. After selecting an intra-prediction mode for a block, intra-prediction unit 246 may provide information indicative of the selected intra-prediction mode for the block to entropy encoding unit 256.

Video encoder 220 forms a residual video block by subtracting the prediction data generated by mode select unit 240 from the original video block being coded. Summer 250 represents the component or components that perform this subtraction operation. Transform processing unit 252 applies a transform, such as a discrete cosine transform (DCT) or a conceptually similar transform, to the residual block, producing a video block comprising transform coefficient values. The transform may convert the residual information from a pixel domain to a transform domain, such as a frequency domain. Transform processing unit 252 may send the resulting transform coefficients to quantization unit 254. Quantization unit 254 quantizes the transform coefficients to further reduce bit rate. The quantization process may reduce the bit depth associated with some or all of the coefficients. The degree of quantization may be modified by adjusting a quantization parameter.

Following quantization, entropy encoding unit 256 entropy encodes the quantized transform coefficients. For example, entropy encoding unit 256 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 256, the encoded bitstream may be transmitted to another device or archived for later transmission or retrieval.

Inverse quantization unit 258 and inverse transform unit 260 apply inverse quantization and inverse transformation, respectively, to reconstruct the residual block in the pixel domain. In particular, summer 262 adds the reconstructed residual block to the motion compensated prediction block earlier produced by motion compensation unit 244 or intra-prediction unit 246 to produce a reconstructed video block for storage in reference picture memory 264 via picture processing unit 266. The reconstructed video block may be used by motion estimation unit 242 and motion compensation unit 244 as a reference block to inter-code a block in a subsequent video frame, or by intra-prediction unit 246 to intra-predict a subsequent block of a current video frame.

It should be understood that picture processing unit 266 may operate according to the techniques of this disclosure when accessing picture data stored in reference picture memory 264. For example, when picture processing unit 266 receives decoded image data from summer 262, picture processing unit 266 may store the decoded image data to reference picture memory 264 by predicting and then calculating residuals for pixels of the image data (e.g., for one or more blocks of image data, similar to block 190 of FIG. 5). Picture processing unit 266 may then determine whether the image data can be compressed, and if so, separate the residual values into MSBs and LSBs, store an indication (e.g., a value for a syntax element) of whether the MSBs are compressed, a size of the MSBs, and compressed data for the MSBs and the uncompressed LSBs.

Likewise, picture processing unit 266 may retrieve image data from reference picture memory 264 by determining whether a block includes compressed MSBs, and if so, sizes of the MSBs, then decompress the MSBs, concatenate the MSBs with corresponding LSBs, add the concatenated MSBs and LSBs to predicted data, and thereby regenerate the image data. In this manner, picture processing unit 266 may reduce bandwidth consumption when accessing (e.g., storing data to or retrieving data from) reference picture memory 264.

It should be understood that the encoding and decoding process performed by picture processing unit 266 is separate from the encoding and decoding process performed by video encoder 220, e.g., by mode select unit 240, summer 250, transform processing unit 252, quantization unit 254, inverse quantization unit 258, inverse transform unit 260, and summer 262. Thus, predicted values, residual values, and reconstructed values calculated by picture processing unit 266 are distinct from predicted values, residual values, and reconstructed values calculated by, e.g., mode select unit 240, summer 250, and summer 262, and serve different purposes.

In this example, picture processing unit 266 is separate from other units of video encoder 220. In other examples, picture processing unit 266 may be incorporated into, e.g., mode select unit 240.

Furthermore, although only one picture processing unit 266 is shown in this example, in other examples, one or more additional picture processing units similar to picture processing unit 266 may be incorporated into video encoder 220. For example, a similar picture processing unit and picture memory may be used to store input raw image data provided to mode select unit 240 and summer 250 (that is, along the input line marked "VIDEO FRAMES").

In this manner, video encoder 220 of FIG. 7 represents an example of a device for storing image data, the device comprising a memory configured to store image data, the memory comprising a first region and a second region; and one or more processing units configured to code most significant bits (MSBs) of a plurality of residuals of samples of a block of an image, each of the residuals representing a respective difference value between a respective raw sample value and a respective predicted value for the respective raw sample value, access the coded MSBs in the first region of the memory, and access least significant bits (LSBs) of the plurality of residuals of the samples in the second region of the memory.

Figure 8:
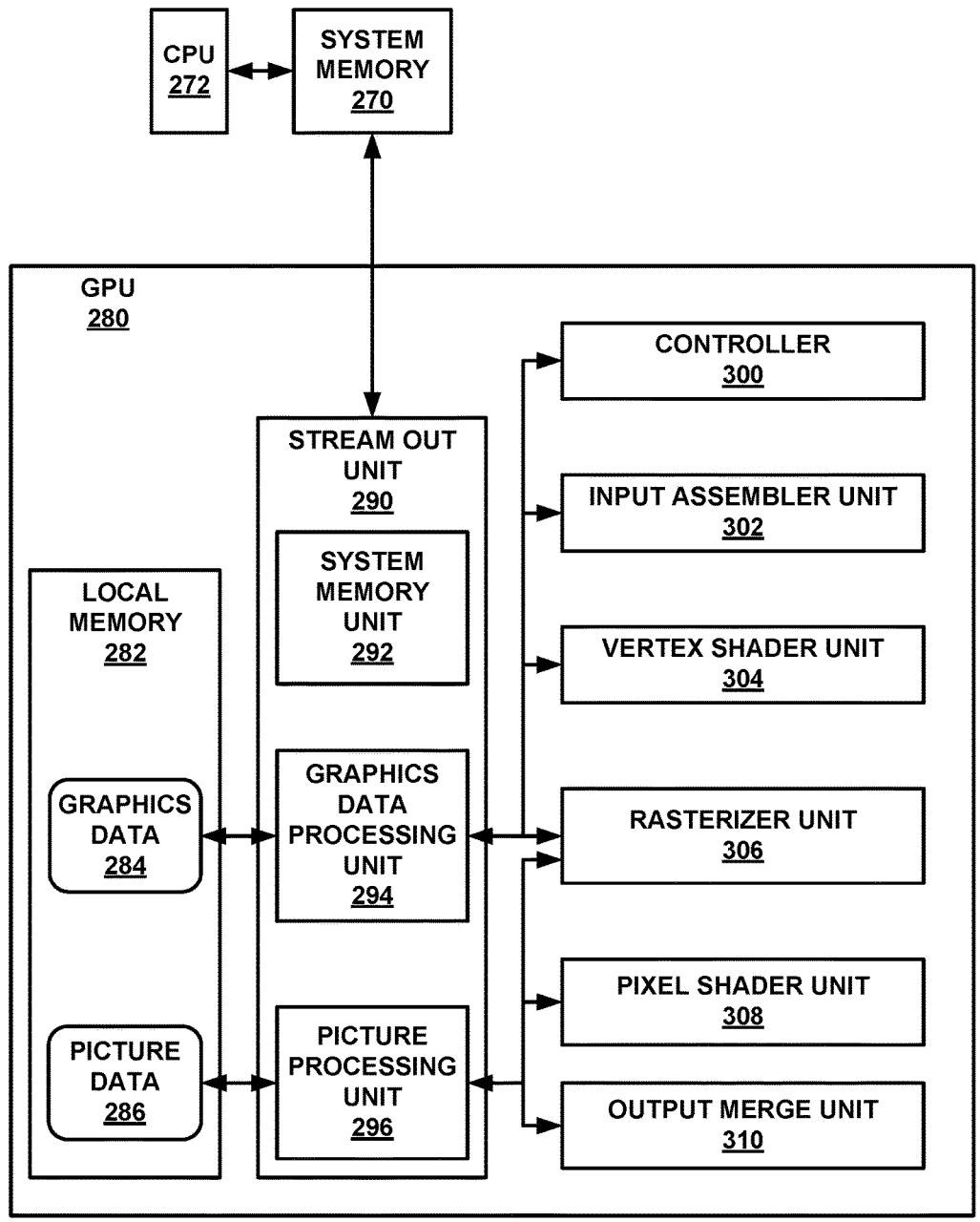
FIG. 8 is a block diagram illustrating an example of a graphics processing unit (GPU) including a picture processing unit that implements techniques for accessing high bit depth image data in accordance with the techniques of this disclosure.

FIG. 8 is a block diagram illustrating an example of a graphics processing unit (GPU) 280 including a picture processing unit that implements techniques for storing high bit depth image data in accordance with the techniques of this disclosure. To perform graphics operations, GPU 280 may implement a graphics processing pipeline. The graphics processing pipeline includes one or more units that perform functions as defined by software or firmware executing on GPU 280 and fixed-function units that are hardwired to perform very specific functions. The software or firmware executing on the GPU 280 may be referred to as shaders, and the shaders may execute on one or more shader cores of GPU 280. Shaders provide users with functional flexibility because a user can design the shaders to perform desired tasks in any conceivable manner. The fixed-function units, however, are hardwired for the manner in which the fixed-function units perform tasks.

In this example, GPU 280 includes input assembler unit 302, vertex shader unit 304, rasterizer unit 306, pixel shader unit 308, and output merge unit 310. GPU 280 may include addition units such a hull shader unit, tessellation unit, and/or domain shader unit (not shown in the example of FIG. 8) that follow vertex shader unit 304, in that order. GPU 280 may also include a geometry shader unit (not shown) coupled to the output of the domain shader unit, if GPU 280 includes a domain shader unit, or the output of the vertex shader unit 304, if GPU 280 does not include the domain shader unit. Rasterizer unit 306 may receive graphics data from vertex shader unit 304, as illustrated, or from a geometry shader unit (when available) or a domain shader unit (when available).

Other configurations of the graphics pipeline are possible, and the techniques described in this disclosure should not be considered limited to the specific example illustrated in FIG. 8. For example, GPU 280 may include more units than those illustrated, and in some examples, GPU 280 may not necessarily include all of the illustrated units. Also, the specific ordering of the units is provided for purposes of illustration and should not be considered limiting.

Input assembler unit 302 may read vertex points of vertices from system memory 270 as defined by CPU 272, and assemble control points to form vertices. For instance, input assembler unit 302 may read vertex point coordinates, color values, and other such information. The coordinates, color values, and other such information may be commonly referred to as attributes of the vertices. Based on the attributes of the vertices, input assembler unit 302 may determine the general layout of graphical primitives (e.g., triangles). In this manner, input assembler unit 302 may assemble the control points to form the patch. Input assembler unit 302 may be a fixed-function unit. Input assembler unit 302 may store data for the vertices as graphics data 284 in local memory 282 via graphics data processing unit 294 of stream out unit 290.

Vertex shader unit 304 may process the data for the vertices from input assembler unit 302. For example, vertex shader unit 304 may retrieve the data for the vertices from graphics data 284 of local memory 282 via graphics data processing unit 294. Vertex shader unit 304 may then perform per-vertex operations such as transformations, skinning, morphing, and per-vertex lighting. Vertex shader unit 304 may then store the resulting data for the vertices as part of graphics data 284 to local memory 282 via graphics data processing unit 294. Vertex shader unit 304 may be a shader.

Rasterizer unit 306 retrieves the data (e.g., graphics primitives) stored by vertex shader unit 304 from graphics data 284 of local memory 282 via graphics data processing unit 294. Rasterizer unit 306 may then convert the primitives into pixels for display. For example, the primitives may be defined as a set of interconnected vectors, and may be defined in a coordinate space that is independent of the display on which the image is to be displayed. Rasterizer unit 306 converts these vectors into display coordinates, and performs any additional functions, such as removing points within primitives that are occluded. Rasterizer unit 306 stores the resulting generated image as picture data 286 via picture processing unit 296.

Picture processing unit 296 may include components substantially similar to those of image processing unit 110 of FIG. 1. Picture processing unit 296 may be configured to perform the techniques of this disclosure. That is, picture processing unit 296 may receive an image from, e.g., rasterizer unit 306. Picture processing unit 296 may convert the image to a set of blocks (such as block 190 of FIG. 5) including a number of pixels (such as residual values 192 of FIG. 5). Picture processing unit 296 may predict values for the pixels, e.g., using left- and/or above-neighboring pixels, and calculate residual values for the pixels as differences between the current values and the predicted values. Picture processing unit 296 may then encode MSBs of the residual values using, e.g., a lossless coding process such as run-length VLC. Picture processing unit 296 may then store the encoded MSBs and the remaining LSBs as picture data 286 of local memory 282. As shown in FIG. 1, the MSBs and LSBs may be stored in separate memory regions. However, in the example of FIG. 8, it would typically be the case that an entire image would be accessed (e.g., stored or retrieved), and thus, the MSBs and LSBs may be stored together in this example.

Subsequently, pixel shader unit 308 may retrieve the rasterized image generated by rasterizer unit 306. In particular, pixel shader unit 308 may retrieve the image from picture data 286 via picture processing unit 296. Thus, picture processing unit 296 may retrieve each block of the image, decode MSBs of residual values for the block, and concatenate the decoded MSBs with respective LSBs of the residual values. Picture processing unit 296 may then add the residual values to corresponding predicted values for the pixels to regenerate the block. Picture processing unit 296 may perform this process for each block of the image to reconstruct the image, and then pass the image to pixel shader unit 208.

Pixel shader unit 308 post-processes pixels of the retrieved image to assign color values to each of the pixels that are to be displayed. For example, pixel shader unit 308 may receive constant values stored in system memory 270, texture data stored in system memory 270, and any other data to generate per-pixel outputs, such as color values. Pixel shader unit 308 may also output opacity values that indicate the opaqueness of the pixels. Pixel shader unit 308 may store the shaded image as picture data 286 via picture processing unit 296, which again may losslessly encode MSBs of residual values and store the encoded MSBs and corresponding LSBs as discussed above as picture data 286.

Output merge unit 310 may perform any final pixel processing on the post-processed image stored in picture data 286. In particular, output merge unit 310 may retrieve the post-processed image from picture data 286 via picture processing unit 296, which again may decode the MSBs of residual values for blocks of the image and reassemble the image as discussed above. Output merge unit 310 may use depth information to further determine whether any of the pixels should not be displayed. Output merge unit 310 may also perform blending operations to generate final pixel values. Output merge unit 310 may output the final pixel values to a frame buffer, generally located within system memory 270, but which may be located within GPU 280.

In the example illustrated in FIG. 8, each one of the units receives data from and outputs data to local memory 282 of GPU 280 via graphics data processing unit 294 or picture processing unit 296. Other examples of local memory exist in addition to or instead of local memory 282. As one example, the units may output data to and receive data from general purpose registers (GPRs). Unlike local memory 282, each of the GPRs may be configured to receive from and output to specific units, rather than being memory for each of the units. GPRs are another example of local memory of GPU 280.

Local memory 282 of GPU 280 stores intermediate data generated by respective units for subsequent retrieval of the intermediate data by the next unit for further processing. For example, input assembler unit 302 retrieves graphics data 284 of local memory 282, performs graphics processing on the retrieved graphics data, and generates first intermediate data that input assembler unit 302 stores in local memory 282 via graphics data processing unit 294. Vertex shader unit 304 retrieves this first intermediate data from local memory 282 via graphics data processing unit 294, performs graphics processing on this retrieved intermediate data, and generates second intermediate data, which vertex shader unit 304 stores as graphics data 284 via graphics data processing unit 294.

Furthermore, rasterizer unit 306, pixel shader unit 308, and output merge unit 310 access (e.g., store and/or retrieve) picture data 286 via picture processing unit 296, which again operates according to the techniques of this disclosure, as discussed above. In this manner, GPU 280 represents an example of a device for storing image data, the device comprising a memory configured to store image data, the memory comprising a first region and a second region; and one or more processing units configured to code most significant bits (MSBs) of a plurality of residuals of samples of a block of an image, each of the residuals representing a respective difference value between a respective raw sample value and a respective predicted value for the respective raw sample value, access the coded MSBs in the first region of the memory, and access least significant bits (LSBs) of the plurality of residuals of the samples in the second region of the memory.

As illustrated, GPU 280 includes stream out unit 290 which is a hardware unit of GPU 280. That is, stream out unit 290 may be implemented using one or more physical processing units, e.g., processing units implemented using fixed and/or programmable logic circuitry. Stream out unit 290 may be configured to receive data from local memory 282, and more particularly, data generated by the graphics processing pipeline, and output that data to system memory 270. Stream out unit 290 may also be configured to receive data from system memory 270 and store the data in local memory 282 (e.g., after the preemption is complete and the original instructions are to execute). Accordingly, stream out unit 290 provides a specialized way for GPU 280 to output intermediate data (e.g., data generated by the geometry pipeline) to system memory 270 and to retrieve this intermediate data from system memory 270.

Although only a single picture processing unit 296 is shown that accesses (e.g., stores and retrieves) data of local memory 282, it should be understood that in other examples, GPU 280 may include or interact with one or more additional picture processing units similar to picture processing unit 296. For example, a picture processing unit that performs the techniques of this disclosure may be provided within stream out unit 290 that accesses (e.g., stores and/or retrieves) image data of system memory 270. Alternatively, this picture processing unit may be positioned between GPU 280 and system memory 270. Additionally or alternatively, a picture processing unit may be included within stream out unit 290, or separate from GPU 280, that receives a rendered image from output merge unit 310 to be displayed (e.g., as part of a display buffer of a device including GPU 280).

Figure 9:
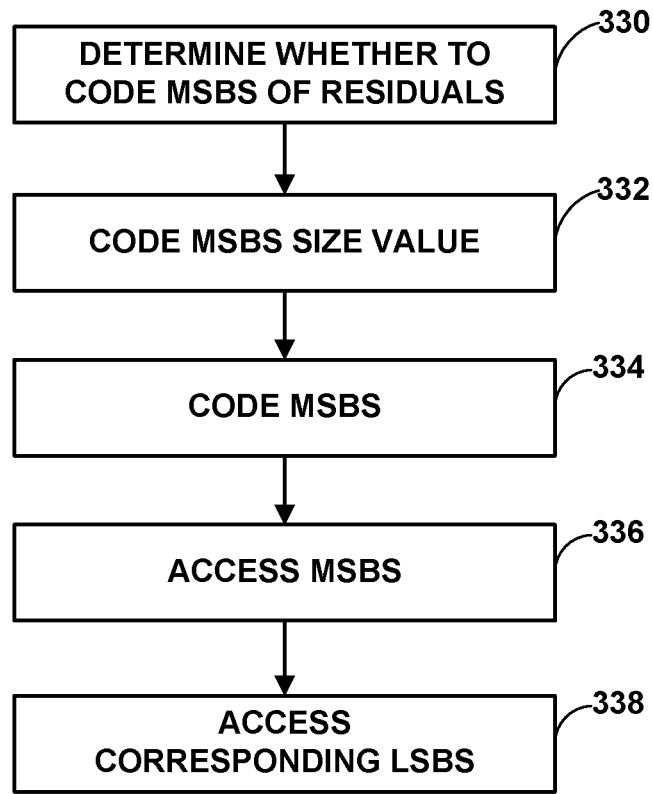
FIG. 9 is a conceptual diagram illustrating an example method of coding a block of image data in accordance with the techniques of this disclosure.

FIG. 9 is a conceptual diagram illustrating an example method of coding a block of image data in accordance with the techniques of this disclosure. In general, the method of FIG. 9 represents coding in terms of both encoding and decoding. The method of FIG. 9 is explained with respect to the example of image processing unit 110 of FIG. 1. However, it should be understood that the other various image processing units of this disclosure (such as image processing units 206 and 216 of FIG. 6, picture processing unit 266 of FIG. 7, and picture processing unit 296 of FIG. 8), and other similar units, may be similarly configured to perform this or a similar method.

In this example, image processing unit 110 initially determines whether to code MSBs of a plurality of residual values (330) for a block of pixels. For example, when encoding and storing, image processing unit 110 may compare a number of coding bits used to represent coded MSBs values to a number of bits used to represent uncoded MSBs values, and determine whether or not to store the coded MSBs values based on this comparison. Also, when encoding and storing, image processing unit 110 may code a value for a compression syntax element indicating whether the MSBs are coded (e.g., a value for compression syntax element 174 of FIG. 4). When decoding and retrieving, image processing unit 110 may determine whether the value of a syntax element indicates that the MSBs are coded (e.g., the value for compression syntax element 174 of FIG. 4).

Assuming image processing unit 110 determines to code the MSBs, image processing unit 110 further codes an MSBs size value (332). For example, the MSBs size value may correspond to the value of MSB size syntax element 176. The MSB size value represents a size, in terms of bits, of the MSBs for residual values of the block.

Image processing unit 110 may then code the MSBs (334). For example, when encoding and storing, image processing unit 110 encodes the MSBs, e.g., using run-length coding using VLC. Furthermore, when encoding and storing, prior to coding the MSBs, image processing unit 110 calculates the residual values and partitions the residual values into the MSBs and the LSBs (not shown in FIG. 9). When decoding and retrieving, image processing unit 110 decodes the MSBs, e.g., using run-length coding using VLC. Furthermore, when decoding and retrieving, after coding the MSBs, image processing unit 110 concatenates the MSBs with the corresponding LSBs to reproduce the residual values, which image processing unit 110 combines with predicted values to reproduce the pixel values.

In the example of FIG. 9, after coding the MSBs, image processing unit 110 accesses the MSBs (336) and accesses the corresponding LSBs (338). In particular, "accessing" may refer to storing or retrieving. When encoding and storing, image processing unit 110 stores the MSBs to compressed MSB region 104 of memory 102 and stores the LSBs to LSB region 106 of memory 102. When decoding and retrieving, steps 336 and 338 would come before step 334, and image processing unit 110 would retrieve the MSBs from compressed MSB region 104 of memory 102 and retrieve the LSBs from LSB region 106 of memory 102.

In this manner, the method of FIG. 9 represents an example of a method of storing image data, the method comprising coding most significant bits (MSBs) of a plurality of residuals of samples of a block of an image, each of the residuals representing a respective difference value between a respective raw sample value and a respective predicted value for the respective raw sample value, accessing the coded MSBs in a first region of a memory, and accessing least significant bits (LSBs) of the plurality of residuals of the samples in a second region of the memory.

Figure 10:
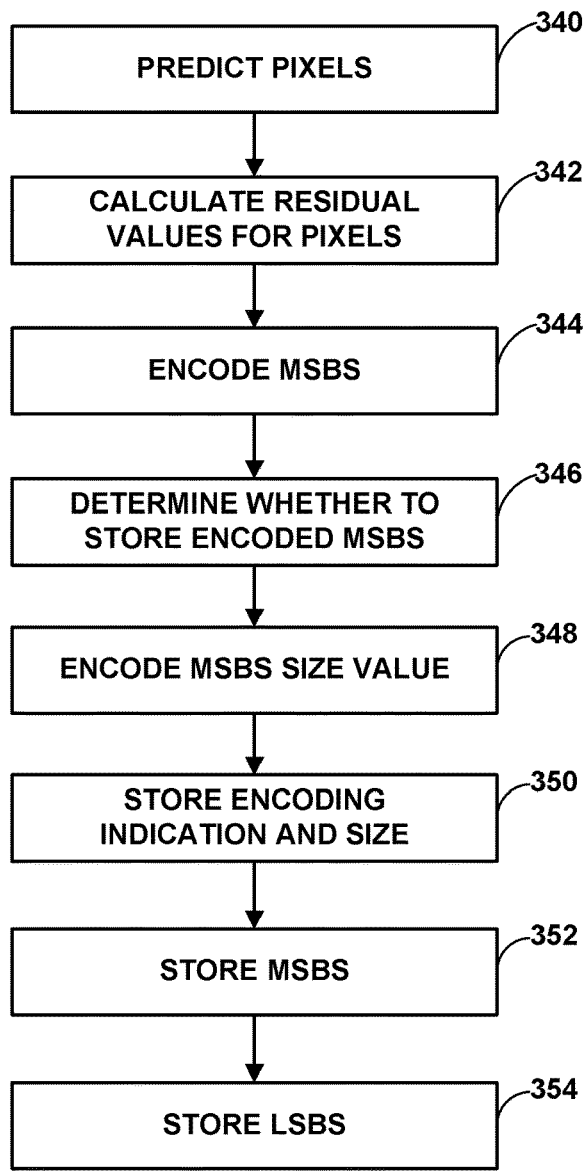
FIG. 10 is a conceptual diagram illustrating an example method for encoding a block of image data in accordance with the techniques of this disclosure.

FIG. 10 is a conceptual diagram illustrating an example method for encoding a block of image data in accordance with the techniques of this disclosure. The method of FIG. 10 is explained with respect to the example of image processing unit 110 of FIG. 1. However, it should be understood that the other various image processing units of this disclosure (such as image processing units 206 and 216 of FIG. 6, picture processing unit 266 of FIG. 7, and picture processing unit 296 of FIG. 8), and other similar units, may be similarly configured to perform this or a similar method.

It is assumed that image processing unit 110 initially partitions a received image into blocks. Image processing unit 110 may perform the method of FIG. 10 on each block of the image. Image processing unit 110 may predict pixels of the block (340). For example, as discussed with respect to FIG. 5, image processing unit may predict pixels using left and/or above neighboring pixel values. The use of left- and/or above-neighboring pixel values is assumed for raster scan order of the pixels. In general, pixel values that have previously been coded may be used for prediction. Accordingly, for other scan orders, other pixels may be used for prediction. For example, for snake scan ordering, above-neighboring, left-neighboring, and/or right-neighboring pixel values may be used for prediction, based on the position of the pixel being predicted and whether the pixel is in a row that is being left-scanned or right-scanned (that is, having left-neighboring pixels or right-neighboring pixels that were previously scanned and coded).

Image processing unit 110 may then calculate residual values for the pixels (342). In particular, image processing unit 110 may calculate differences between the original values for the pixels and the predicted values for the pixels. In this manner, image processing unit 110 may produce residual values for each of the pixels of the block.

Image processing unit 110 may then encode MSBs of the residual values (344). For example, image processing unit 110 may determine a number of bits for the residual values to treat as MSBs, and then use a lossless coding technique, such as run-length coding using VLC, to encode the MSBs.

After encoding the MSBs, image processing unit 110 may determine whether to store the encoded MSBs values (346). For example, image processing unit 110 may compare a number of bits used to represent the encoded MSBs to a number of bits used to represent the uncoded MSBs. If the number of bits used to represent the encoded MSBs is less than the number of bits used to represent the uncoded MSBs (or the number of bits used to represent the uncoded MSBs minus a threshold value), image processing unit 110 may determine to store the encoded MSBs. Otherwise, image processing unit 110 may store uncoded data for the block instead of encoded MSBs.

Assuming that image processing unit 110 determines to store the encoded MSBs, image processing unit 110 may encode an MSBs size value (348). The MSBs size value represents a number of bits included in the MSBs for the block. For example, in the example of FIG. 3, the number of bits included in the MSBs is two. In other examples, other numbers of MSBs may be used. In one example, the same number of MSBs is used for all pixels of the block. Likewise, the same number of LSBs may be used for all pixels of the block. If there are fewer bits in a given full residual value, image processing unit 110 may pad the MSBs value for the residual value with zeros.

Likewise, image processing unit 110 may then store the encoding indication and the size value (350). Image processing unit 110 may also store the MSBs (352). For example, image processing unit 110 may store this data in compressed MSB region 104 of memory 102, in a form similar to packet 170 of FIG. 4. In addition, image processing unit 110 may store the LSBs (354), e.g., in LSB region 106 of memory 102. Again, compressed MSB region 104 and LSB region 106 may comprise the same region, or different regions, of memory 102. When compressed MSB region 104 and LSB region 106 are different regions of memory 102, image processing unit 110 may store pointers to the locations of corresponding LSBs with the MSBs in compressed MSB region 104.

In this manner, the method of FIG. 10 represents an example of a method of storing image data, the method comprising coding (specifically, encoding) most significant bits (MSBs) of a plurality of residuals of samples of a block of an image, each of the residuals representing a respective difference value between a respective raw sample value and a respective predicted value for the respective raw sample value, accessing (i.e., storing) the coded MSBs in a first region of a memory, and accessing (i.e., storing) least significant bits (LSBs) of the plurality of residuals of the samples in a second region of the memory.

Figure 11:
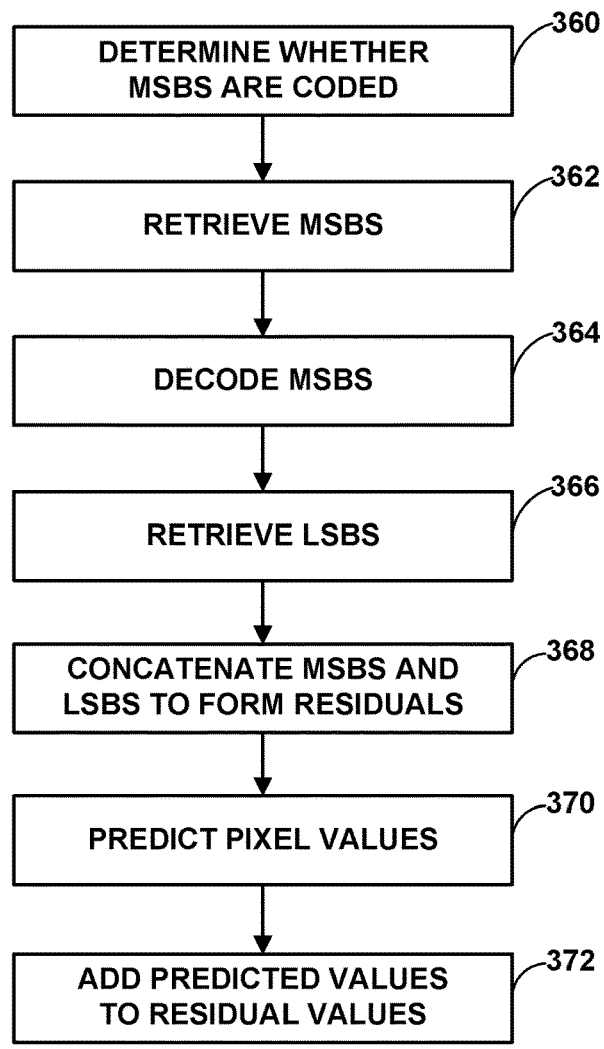
FIG. 11 is a conceptual diagram illustrating an example method for decoding a block of image data in accordance with the techniques of this disclosure.

FIG. 11 is a conceptual diagram illustrating an example method for decoding a block of image data in accordance with the techniques of this disclosure. The method of FIG. 11 is explained with respect to the example of image processing unit 110 of FIG. 1. However, it should be understood that the other various image processing units of this disclosure (such as image processing units 206 and 216 of FIG. 6, picture processing unit 266 of FIG. 7, and picture processing unit 296 of FIG. 8), and other similar units, may be similarly configured to perform this or a similar method.

Initially, image processing unit 110 determines whether MSBs of residual values of a block of an image are coded (360). For example, image processing unit 110 may retrieve a value for a compression syntax element, such as compression syntax element 174 (FIG. 4), indicating whether the MSBs of the residual values for the block are coded. In the example of FIG. 11, it is assumed that the MSBs are coded.

Accordingly, image processing unit 110 retrieves the MSBs (362). For example, image processing unit 110 may retrieve the MSBs from compressed MSB region 104 of memory 102. The retrieved MSBs data may further include pointers to corresponding LSBs, or the LSBs themselves.

Image processing unit 110 may then decode the MSBs (364). For example, image processing unit 110 may determine the value of a VLC codeword, then determine a corresponding MSBs residual value and a run value indicating a number of MSBs in scan order having the same MSBs residual value.

Image processing unit 110 may also retrieve the LSBs (366), assuming that the LSBs were not previously retrieved. For example, if the MSBs data included pointers to the LSBs data, image processing unit 110 may retrieve the LSBs from the memory addresses identified by the pointers.

Image processing unit 110 may then concatenate the MSBs with the corresponding LSBs to reconstruct the residual values for the pixels (368). Image processing unit 110 may further predict the pixel values (370), e.g., using left- and/or above-neighboring pixel values that were previously reconstructed. Image processing unit 110 may further add the predicted values to the corresponding residual values to reconstruct the full pixel values (372). In particular, image processing unit 110 may reconstruct each pixel value in scan order, such that the pixels are available for prediction of subsequent pixels of the block.

In this manner, the method of FIG. 11 represents an example of a method of storing image data, the method comprising coding (specifically, decoding) most significant bits (MSBs) of a plurality of residuals of samples of a block of an image, each of the residuals representing a respective difference value between a respective raw sample value and a respective predicted value for the respective raw sample value, accessing (i.e., retrieving) the coded MSBs in a first region of a memory, and accessing (i.e., retrieving) least significant bits (LSBs) of the plurality of residuals of the samples in a second region of the memory.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of accessing image data, the method comprising:
coding most significant bits (MSBs) of a plurality of residuals of samples of a block of an image, each of the residuals representing a respective difference value between a respective raw sample value and a respective predicted value for the respective raw sample value;
accessing the coded MSBs in a first region of a memory; and accessing least significant bits (LSBs) of the plurality of residuals of the samples in a second region of the memory.

2. The method of claim 1, wherein coding the MSBs comprises encoding the MSBs, wherein accessing the coded MSBs comprises storing the encoded MSBs, and wherein accessing the LSBs comprises storing the LSBs, the method further comprising calculating the respective difference values between the respective raw sample values and the respective predicted values.

3. The method of claim 1, wherein accessing the coded MSBs comprises retrieving encoded MSBs, wherein coding the MSBs comprises decoding the encoded MSBs to reproduce the MSBs, and wherein accessing the LSBs comprises retrieving the LSBs, the method further comprising:
concatenating the reproduced MSBs with the respective LSBs to reproduce the residuals of the samples of the block; and
adding the respective predicted values to the respective reproduced residuals.

4. The method of claim 1, further comprising determining the predicted value of a current sample using a value of at least one of a left-neighboring sample or an above-neighboring sample to the current sample.

5. The method of claim 1, wherein coding the MSBs comprises coding the MSBs after determining whether to code the MSBs.

6. The method of claim 5, wherein determining whether to code the MSBs comprises determining whether the MSBs can be compressed, the method further comprising encoding a value for a syntax element indicating that the MSBs are compressed after determining that the MSBs can be compressed.

7. The method of claim 5, wherein determining whether to code the MSBs comprises decoding a value for a syntax element indicating that the MSBs are compressed.

8. The method of claim 1, further comprising coding a value for a syntax element indicating a number of bits included in the MSBs.

9. The method of claim 1, wherein coding the MSBs comprises coding the MSBs using a lossless compression algorithm.

10. The method of claim 1, wherein coding the MSBs comprises run-length coding the MSBs using variable length codes (VLC).

11. The method of claim 1, wherein coding the MSBs comprises coding the MSBs using one of Truncated-Unary codes or Exponential-Golomb codes.

12. The method of claim 1, wherein the first region and the second region comprise the same region.

13. The method of claim 1, wherein the first region and the second region comprise different regions.

14. The method of claim 1, wherein accessing the coded MSBs further comprises accessing pointer data in the first region of the memory, the pointer data representing addresses of the LSBs in the second region of the memory.

15. A device for accessing image data, the device comprising:
a memory configured to store image data, the memory comprising a first region and a second region; and
one or more processing units configured to:
code most significant bits (MSBs) of a plurality of residuals of samples of a block of an image, each of the residuals representing a respective difference value between a respective raw sample value and a respective predicted value for the respective raw sample value;
access the coded MSBs in the first region of the memory; and
access least significant bits (LSBs) of the plurality of residuals of the samples in the second region of the memory.

16. The device of claim 15, wherein the one or more processors are configured to encode the MSBs, store the encoded MSBs to the memory, store the LSBs to the memory, and calculate the respective difference values between the respective raw sample values and the respective predicted values.

17. The device of claim 15, wherein the one or more processors are configured to retrieve encoded MSBs from the memory, decode the encoded MSBs to reproduce the MSBs, retrieve the LSBs from the memory, concatenate the reproduced MSBs with the respective LSBs to reproduce the residuals of the samples of the block, and add the respective predicted values to the respective reproduced residuals.

18. The device of claim 15, wherein the one or more processors are configured to determine the predicted value of a current sample using a value of at least one of a left-neighboring sample or an above-neighboring sample to the current sample.

19. The device of claim 15, wherein the one or more processors are configured to code the MSBs after determining whether to code the MSBs.

20. The device of claim 15, wherein the one or more processors are further configured to code a value for a syntax element indicating a number of bits included in the MSBs.

21. The device of claim 15, wherein the first region and the second region comprise different regions.

22. A device for accessing image data, the device comprising:
means for coding most significant bits (MSBs) of a plurality of residuals of samples of a block of an image, each of the residuals representing a respective difference value between a respective raw sample value and a respective predicted value for the respective raw sample value;
means for accessing the coded MSBs in a first region of a memory; and
means for accessing least significant bits (LSBs) of the plurality of residuals of the samples in a second region of the memory.

23. The device of claim 22, wherein the means for coding the MSBs comprises means for encoding the MSBs, wherein the means for accessing the coded MSBs comprises means for storing the encoded MSBs, and wherein the means for accessing the LSBs comprises means for storing the LSBs, further comprising means for calculating the respective difference values between the respective raw sample values and the respective predicted values.

24. The device of claim 22, wherein the means for accessing the coded MSBs comprises means for retrieving encoded MSBs, wherein the means for coding the MSBs comprises means for decoding the encoded MSBs to reproduce the MSBs, and wherein the means for accessing the LSBs comprises means for retrieving the LSBs, further comprising:
means for concatenating the reproduced MSBs with the respective LSBs to reproduce the residuals of the samples of the block; and
means for adding the respective predicted values to the respective reproduced residuals.

25. The device of claim 22, further comprising means for determining the predicted value of a current sample using a value of at least one of a left-neighboring sample or an above-neighboring sample to the current sample.

26. The device of claim 22, further comprising means for coding a value for a syntax element indicating a number of bits included in the MSBs.

27. The device of claim 22, wherein the first region and the second region comprise different regions.

28. A computer-readable storage medium having stored thereon instructions that, when executed, cause a processor to:
  code most significant bits (MSBs) of a plurality of residuals of samples of a block of an image, each of the residuals representing a respective difference value between a respective raw sample value and a respective predicted value for the respective raw sample value;
  access the coded MSBs in a first region of a memory; and
  access least significant bits (LSBs) of the plurality of residuals of the samples in a second region of the memory.

29. The computer-readable storage medium of claim 28, wherein the instructions that cause the processor to code the MSBs comprise instructions that cause the processor to encode the MSBs, wherein the instructions that cause the processor to access the coded MSBs comprise instructions that cause the processor to store the encoded MSBs, and wherein the instructions that cause the processor to access the LSBs comprise instructions that cause the processor to store the LSBs, further comprising instructions that cause the processor to calculate the respective difference values between the respective raw sample values and the respective predicted values.

30. The computer-readable storage medium of claim 28, wherein the instructions that cause the processor to access the coded MSBs comprise instructions that cause the processor to retrieve encoded MSBs, wherein the instructions that cause the processor to code the MSBs comprise instructions that cause the processor to decode the encoded MSBs to reproduce the MSBs, and wherein the instructions that cause the processor to access the LSBs comprise instructions that cause the processor to retrieve the LSBs, further comprising instructions that cause the processor to:
  concatenate the reproduced MSBs with the respective LSBs to reproduce the residuals of the samples of the block; and
  add the respective predicted values to the respective reproduced residuals.

31. The computer-readable storage medium of claim 28, further comprising instructions that cause the processor to determine the predicted value of a current sample using a value of at least one of a left-neighboring sample or an above-neighboring sample to the current sample.

32. The computer-readable storage medium of claim 28, further comprising instructions that cause the processor to code a value for a syntax element indicating a number of bits included in the MSBs.

33. The computer-readable storage medium of claim 28, wherein the first region and the second region comprise different regions.

* * * * *